United States Patent
Lee

(10) Patent No.: US 7,417,537 B2
(45) Date of Patent: Aug. 26, 2008

(54) MILITARY WIRELESS COMMUNICATION TERMINAL

(75) Inventor: Min-Hwa Lee, Seoul (KR)

(73) Assignee: HealthPia America Co., Ltd., Palisades Park, NJ (US)

( * ) Notice: Subject to any disclaimer, the term of this patent is extended or adjusted under 35 U.S.C. 154(b) by 324 days.

(21) Appl. No.: 11/319,401

(22) Filed: Dec. 29, 2005

(65) Prior Publication Data

US 2006/0238331 A1    Oct. 26, 2006

(51) Int. Cl.
*G08B 1/08*    (2006.01)

(52) U.S. Cl. .............................. 340/539.1; 340/539.11; 342/357.06; 342/357.17; 342/357.01

(58) Field of Classification Search ............... 340/539.1
See application file for complete search history.

(56) References Cited

U.S. PATENT DOCUMENTS

| | | | |
|---|---|---|---|
| 5,601,435 A | 2/1997 | Quy | |
| 5,678,571 A | 10/1997 | Brown | |
| 5,832,448 A | 11/1998 | Brown | |
| 5,899,855 A | 5/1999 | Brown | |
| 5,918,603 A | 7/1999 | Brown | |
| 5,960,403 A | 9/1999 | Brown | |
| 6,151,586 A | 11/2000 | Brown | |
| 6,161,095 A | 12/2000 | Brown | |
| 6,198,394 B1 * | 3/2001 | Jacobsen et al. | 340/573.1 |
| 6,246,992 B1 | 6/2001 | Brown | |
| 6,368,273 B1 | 4/2002 | Brown | |
| 6,381,577 B1 | 4/2002 | Brown | |
| 6,392,661 B1 * | 5/2002 | Tankersley | 345/660 |
| 6,437,727 B2 * | 8/2002 | Lemelson et al. | 342/45 |
| 6,826,477 B2 * | 11/2004 | Ladetto et al. | 701/217 |
| 6,968,375 B1 | 11/2005 | Brown | |
| 7,243,008 B2 * | 7/2007 | Stockdale et al. | 701/3 |

* cited by examiner

*Primary Examiner*—Jeff Hofsass
*Assistant Examiner*—Kerri L McNally
(74) *Attorney, Agent, or Firm*—Holland & Knight LLP

(57) ABSTRACT

A military wireless communication terminal includes a global positioning system receiver outputting location information of the terminal, a terrestrial magnetism sensor for sensing azimuth of the terminal, a memory in which map information of an operating area is stored, a location transmitting unit for periodically transmitting terminal location information output from the global positioning system receiver, a radio communication unit for transmitting and receiving signals from a designated originating place, a military force location information processing unit for generating military force location information, an absolute azimuth calculator for correcting sensed azimuth by the terrestrial magnetism sensor and outputting azimuth information, a map information reading unit for reading map information, a location information overlaying unit for overlaying the azimuth information, the military force location information on the read map information; and a display for showing the read map information with the azimuth information and military force information overlaid.

19 Claims, 4 Drawing Sheets

MILITARY WIRELESS COMMUNICATION TERMINAL

The present invention claims the benefit of International Application Number PCT/KR2004/001619, filed Jul. 1, 2004 and Korean Patent Application No. 10-2003-0044258 filed in Korea on Jul. 1, 2003, which are hereby incorporated by reference in their entirety.

BACKGROUND OF THE INVENTION

1. Field of the Invention

The present invention relates to a communication device, and more particularly to a military wireless communication terminal. Although the present invention is suitable for a wide scope of applications, it is particularly suitable for displaying combat information and for measuring the vital signs of soldiers carrying the communication terminal.

2. Discussion of the Related Art

Soldiers can now wear bulletproof helmets having sensor tags that allow for allied forces to identify each other and to distinguish enemy forces. This equipment for detecting friend or foe can actually be mounted on a rifle. Such technologies have been developed in response to appeals for new battlefield technology by the military. In general, the military is looking for technology to increase the capabilities and self-reliance of smaller fighting units as well as to gain an edge on the battlefield.

Portable wireless communication terminals enhance the effectiveness of fighting units, especially if carried by each individual. Since such wireless communication terminals can be used to trace the location of the soldiers, an overall strategy can be constantly monitored while maintaining the flexibility to change tactics. If the location information of enemy forces as well as the location information of allied forces are available by using portable wireless communication terminals, the allied forces will have a better chance of victory since the allied forces will have a more complete battlefield picture upon which to make decisions. For this reason, there is a need for the development of a military wireless communication terminal, which is capable of receiving location information of both the enemy and allied forces located around a soldier carrying the military wireless communication terminal.

SUMMARY OF THE INVENTION

Accordingly, the present invention is directed to a military wireless communication terminal that substantially obviates one or more of the problems due to limitations and disadvantages of the related art.

An object of the present invention to provide a military wireless communication terminal for sending location information of a soldier to a military command post and displaying location information of the enemy and allied forces, which are located around the soldier carrying the military wireless communication terminal, received from the military command post.

It is another object of the present invention to provide a military wireless communication terminal for checking vital signs of a soldier and sending the checked vital signs to a military command post.

It is still another object of the present invention to provide a military wireless communication terminal, which is capable of receiving and displaying only command and control messages sent from a particular originating place and allowing only a selected terminal to communicate with the originating place.

It is still another object of the present invention to provide a military wireless communication terminal for providing convenient economic settlement for a soldier.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an aspect of the present invention, a military wireless communication terminal includes a global positioning system receiver for receiving a global positioning system signals and outputting location information of the terminal based on the received global positioning system signals; a terrestrial magnetism sensor for sensing azimuth of the terminal; a memory in which map information of an operating area is stored; a location transmitting unit for periodically transmitting terminal location information output from the global positioning system receiver; a radio communication unit for transmitting and receiving signals from a designated originating place; a military force location information processing unit for generating military force location information from a signal received from the radio communication unit; an absolute azimuth calculator for correcting sensed azimuth by the terrestrial magnetism sensor based on the terminal location information and outputting azimuth information; a map information reading unit for reading map information from the memory based on the terminal location information; a location information overlaying unit for overlaying the azimuth information, the military force location information on the read map information; and a display for showing the read map information with the azimuth information and military force information overlaid.

In another aspect, a military wireless communication terminal, includes a global positioning system receiver for receiving a global positioning system signals and outputting location information of the terminal based on the received global positioning system signals; a terrestrial magnetism sensor for sensing azimuth of the terminal; a memory in which map information of an operating area is stored; a location transmitting unit for periodically transmitting terminal location information output from the global positioning system receiver; a radio communication unit for transmitting the location information of the terminal outputted from the location transmitting unit wirelessly and receiving signals; a body temperature sensor for sensing body temperature; a vital signs sensor for sensing at least one of blood pressure and pulse; a vital signs measuring and processing unit for measuring the vital signs of the soldier through the sensors and, when it is determined that the measured vital signs are abnormal, controlling the radio communication unit to a send a signal regarding the abnormal vital sign; a military force location information processing unit for generating military force location information from a signal received from the radio communication unit; an absolute azimuth calculator for correcting sensed azimuth by the terrestrial magnetism sensor based on the terminal location information and outputting azimuth information; a map information reading unit for reading map information from the memory based on the terminal location information; a location information overlaying unit for overlaying the azimuth information, the military force location information on the read map information; and a display for showing the read map information with the azimuth information and military force information overlaid.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. In the following detailed description, explanation of related known functions or constituent parts are omitted in order to prevent the subject matter of the present invention from being unclear.

The military wireless communication terminal of an embodiment of the present invention is configured such that each soldier carrying the military wireless communication terminal receives the location information of the enemy and allied forces. Thus, the soldiers can annihilate the enemy forces without over exposing themselves and/or in close corporation with allied forces. The military wireless communication terminal can further include a body temperature sensor for sensing body temperature, a vital signs sensor for sensing vital signs, such as blood pressure and pulse, and a vital signs measuring and processing unit for measuring the vital signs of the soldier through the sensors and, when it is determined that the measured vital signs are abnormal, sending a radio transmission regarding the abnormality. Thus, the death or the degree of injury of each soldier can be monitored at a military command post, so that tactics corresponding to a current situation of the allied forces can be promptly devised so that assistance can be dispatched.

The military wireless communication terminal can also includes a memory in which personal information of each soldier is stored. This memory is employed to promptly report the personal information of each soldier together with information of his vital signs to the military command post. More preferably, the military wireless communication terminal further includes a communication processing unit for generating a call sound in response to only a call from a designated originating place and calls only a designated destination terminal. The reason for the restriction of the generation of the call sound from the originating place and the calling to the destination terminal is to prevent intervention by the enemy and to maintain communication security. In addition or in the alternative, the military wireless communication terminal can further includes a message displaying unit on which only a command and control message transmitted from the designated originating place is displayed.

Figure 1:
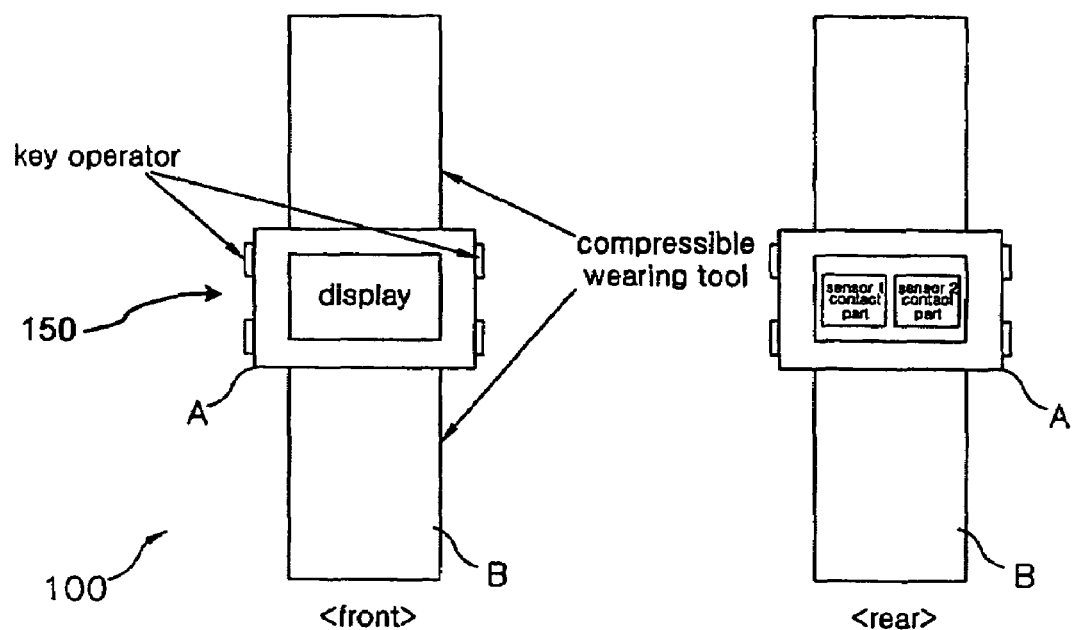
FIG. 1 is a diagram showing an external form of a military wireless communication terminal according to an embodiment of the present invention.

FIG. 1 is a diagram showing the external shape of a military wireless communication terminal according to an embodiment of the present invention. As shown in FIG. 1, the terminal 100 according to an embodiment of the present invention includes a main body A and a wearing appendage B for attaching the main body A to a soldier. The terminal according to an embodiment of the present invention is configured such that the main body A is affixed to the wrist, like a wristwatch, by the wearing appendage B. A display 150 is located on a top surface of the main body A and contacts parts of sensors for sensing vital signs of the soldier is located on a bottom surface of the main body A. In addition, key buttons can be provided at both sides of the main body A.

Figure 2:
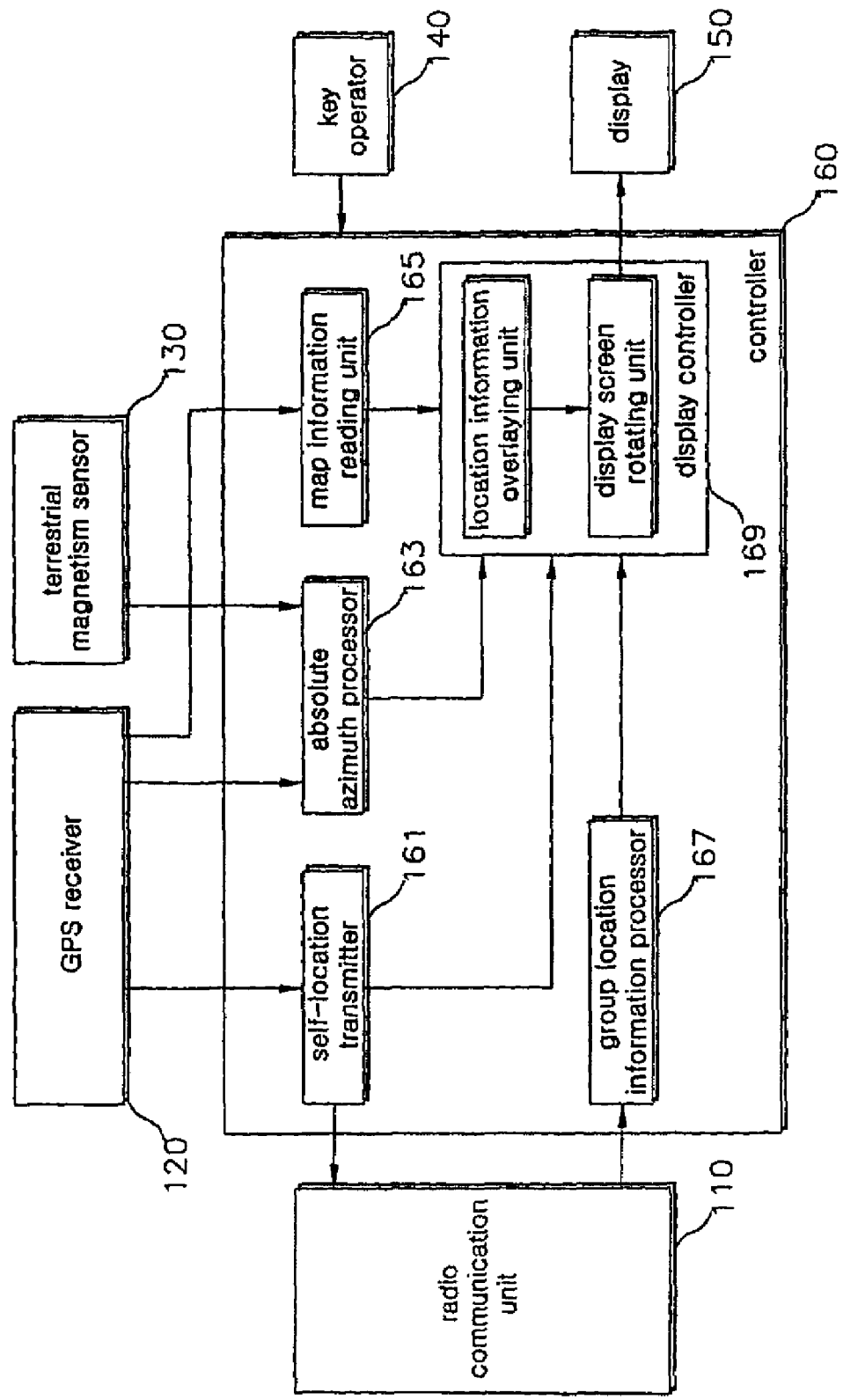
FIG. 2 is a block diagram of the military wireless communication terminal according to an embodiment of the present invention.

FIG. 2 is a block diagram of the military wireless communication terminal according to an embodiment of the present invention. The circuital structure of the main body A will be described with reference to FIG. 2. A radio communicating unit 110 performs modulation and frequency-conversion, like Code Division Multiple Access (CDMA), on voice or data under control of a controller 160. The modulated and frequency-converted voice or data is wirelessly transmitted through an antenna. The communicating unit 110, performs frequency-conversion and demodulation for radio signals received through the antenna, and transmits the frequency-converted and demodulated radio signals to a controller 160. A GPS receiver 120 is used to determine location of the terminal via the reception of GPS signals through the antenna and calculates location information (longitude and latitude data) of the terminal. A terrestrial magnetism sensor 130 is used to sense azimuth of the terminal. An absolute azimuth processor 163 calculates an absolute azimuth by correcting the azimuth information sensed by the terrestrial magnetism sensor 130 by the location information of the terminal. The calculated absolute azimuth is utilized to indicate true north. For reference, the location information from the GPS receiver 120 can co-operates with the azimuth information from the terrestrial magnetism sensor 130.

A key operator 140 has key buttons for generating commands to reduce, enlarge or rotate images on the display 150. The key operator 140 additionally includes functional keys for establishing a call connection and selecting various kinds of functions. The display 150 can displays map information under control of a display controller 169. The display controller 169 generally includes a location information overlaying unit and a display screen rotating unit.

The controller 160, which generally controls operation of the terminal and can be configured as one-chip that includes a self-location transmitter 161. The self-location transmitter 161 transmits the location information of the terminal output from the GPS receiver 120 to a military command post through the radio communicating unit 110. The controller can periodically transmit the location information of the terminal so that the location of the soldier can be constantly tracked. A group location information processor 167 generates location information of a group of allied forces and a group of enemy forces from a signal received through the radio communicating unit 110. For reference, the location information of the group of allied forces is based on the location information of the terminal transmitted from each terminal possessed by each soldier. On the other hand, the location information of the group of the enemy is information generated on the basis of a satellite imagery or other intelligence. Thus, the military command post can provide the location information of the group of the enemy located around the group of allied forces. The location information of the enemy can be indicated in red, for example, to distinguish between the enemy and allied forces.

A map information reading unit 165 reads out map information centered on current location information of the terminal from a memory (not shown) in which map information of an operating area is stored. Because the operational area can change, it is preferable to use a portable memory as the memory.

The display controller 169 includes the location information overlaying unit and the display screen rotating unit. The location information overlaying unit overlays the groups of the enemy and allied forces received from the group location information processor 167 on the map information read from the memory so as to display the overlaid information on the display 150 based on the self-location received from the self-location transmitter 161 and the absolute azimuth information received from the absolute azimuth processor 163. In the alternative, the displayed image can be rotated such that the true north is in the upward direction of the display, according to instructions input by a user through the key operator 140.

Soldiers battling against the enemy forces receive the location information of the enemy and allied forces located around them from the military wireless communication terminal as described above. More particularly, the location information of the terminal is detected by the GPS receiver 120. The location information of the terminal detected by the GPS receiver 120 is periodically transmitted to the military command post through the self-location transmitter 161 and the radio communicating unit 110. Accordingly, the military command post receives the location information of the allied forces located within the operating area. Assuming that the military command post is a master station and each terminal possessed by each soldier is a slave station, the location information of each slave station is separately reported to the master station. In contrast, the military command post as the master station transmits the location information of the enemy forces identified by a surveillance satellite to all of the military wireless communication terminals wirelessly along with the location information of the allied forces.

At this time, there exists a slight difference between group location information transmitted from the master station to one slave station and that transmitted from the master station to another slave station. This is because the group location information of the allied forces and the enemy forces must be indicated on the basis of each slave station. When the group location information is transmitted wirelessly from the military command post as the master station to each slave station, a relevant terminal 100 receives a radio signal including the group location information of the enemy and allied forces through the radio communicating unit 110, and the group location information processor 167 extracts the group location information from the radio signal received through the radio communicating unit 110 and outputs the extracted group location information to the display controller 169.

The location information overlaying unit of the display controller 169 overlays the self-location and azimuth information of the terminal 100 and the group location information of the enemy and allied forces on the map information read from the map information reading unit 165 and displays the overlaid map information on the display 150. The displayed map information is map information centered on the terminal location information detected by the GPS receiver 120 and oriented by the azimuth information. The displayed map information can be self-oriented, regardless of how a user is oriented, based upon azimuth information received from the absolute azimuth processor 163.

In an alternative to the self-oriented displayed map information, the soldier can operate the key buttons of the key operator 140 such that the true north is directed upward. In response to such an operation by the soldier, as the display screen rotating unit rotates the display screen to direct true north upward, the soldier can see the map information indicating that the true north is always directed upward through the display 150, and the group location information of the enemy and allied forces centered on himself in the display screen. In addition or in another alternative, the displayed map information can be centered on another geographic location selected by the soldier.

Figure 3:
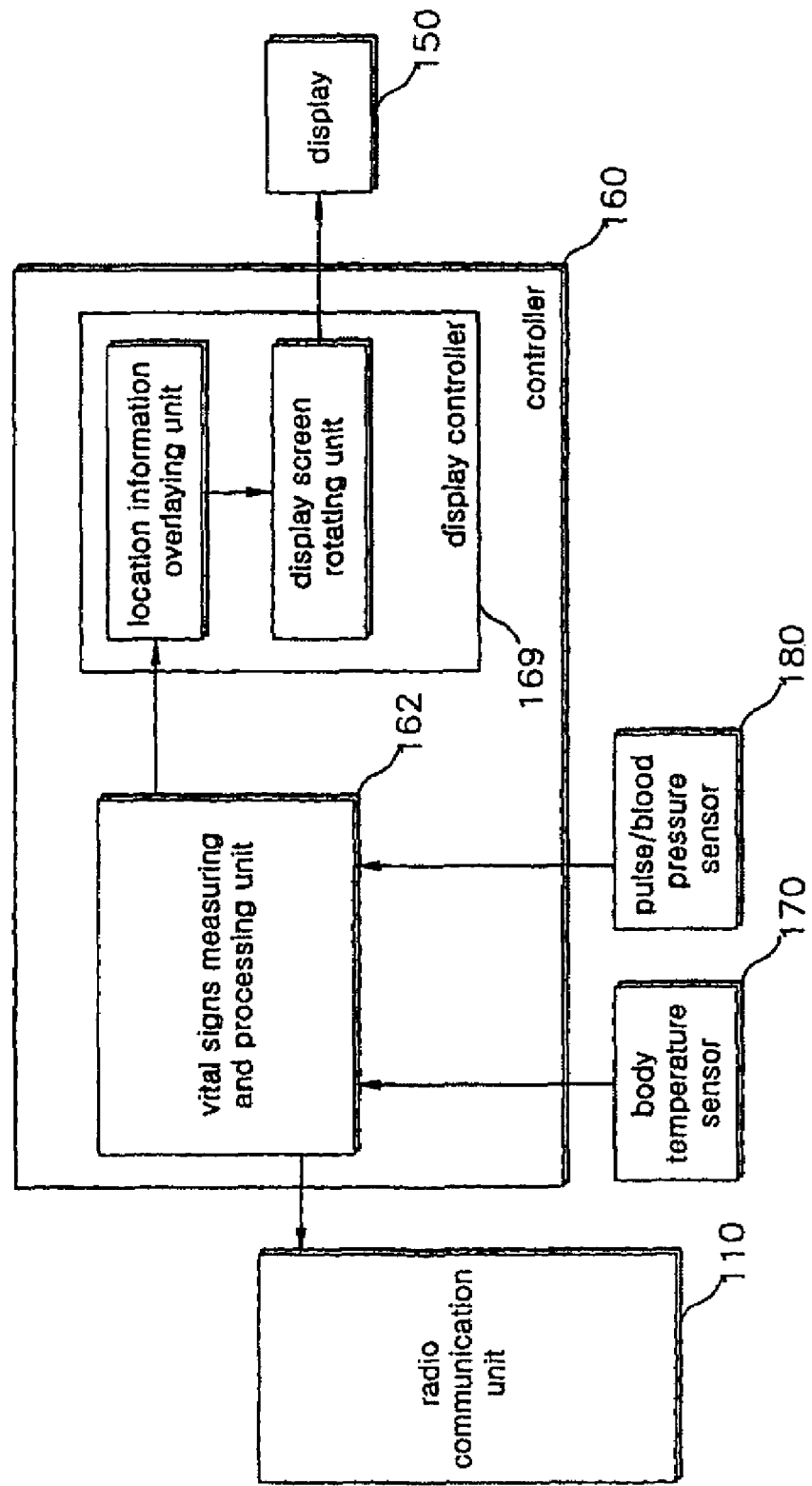
FIG. 3 is a block diagram showing additional functional blocks in the military wireless communication terminal shown in FIG. 2.

In addition to the terminal receiving the location information of the enemy and allied forces located around a particular soldier, components for monitoring vital signs of the soldier from a remote location can be added to such a structure of the terminal. Hereinafter, such additional components will be described with reference to FIG. 3, which shows a block diagram showing additional functional blocks for monitoring the vital signs of the soldier at the remote location in the military wireless communication terminal shown in FIG. 2. As shown in FIG. 3, sensors 170 and 180 are needed to sense the vital signs of the soldier. Such sensors can include a body temperature sensor 170 for sensing the body temperature of the soldier and a vital signs sensor 180 for sensing at least one of blood pressure and pulse of the soldier. These types of sensors are well known to those skilled in the art, and hence, detailed explanation thereof will be omitted for the sake of brevity.

The terminal 100 can includes a vital signs measuring and processing unit 162 for measuring the vital signs of the soldier from a signal sensed by the sensors 170 and 180, and, when it is determined that the measured vital signs are abnormal, controlling radio transmission of the abnormality. For example, the vital signs measuring and processing unit 162 can check a degree of injury or death of the soldier by comparing the sensed body temperature or blood pressure with a predetermined value. Since it is necessary for the military command post to identify a seriously injured or dead soldier, the vital signs measuring and processing unit 162 has to transmit information of the measured vital signs to the military command post, together with personal information of the soldier. The personal information of the soldier can be stored in a memory 190, which will be described with reference to FIG. 4. In addition, the personal information can include the name, the serial number, and/or expertise of the soldier.

As described above, since the military command post at the remote location can check the vital signs of each soldier through the vital signs measuring and processing unit 162 possessed by each soldier, military power can be efficiently controlled and managed. More particularly, the military wireless communication terminal is useful to determine a degree of injury or death of soldiers battling against the enemy forces, and, additionally to efficiently support the allied forces in military drills since a remote command office issues a rest order to soldiers if pulses of soldiers rise above a normal value under non-combat situations, for example, during the marching of the soldiers.

For reference, although the terminal can sense and measure the vital signs of the soldier periodically according to the set mode of the terminal and transmit the sensed and measured vital signs to a military command post server, alternatively, it can transmit the sensed and measured vital signs to the military command post server according to an information transmission request from the military command post server. In addition, although the terminal to which the body temperature sensor 170 and the pulse/blood pressure sensor 180 are attached has been illustrated in an embodiment of the present invention, vital sensing signals received from sensors mounted on a bluetooth module without attachment to the terminal can be used to measure vital signs.

Figure 4:
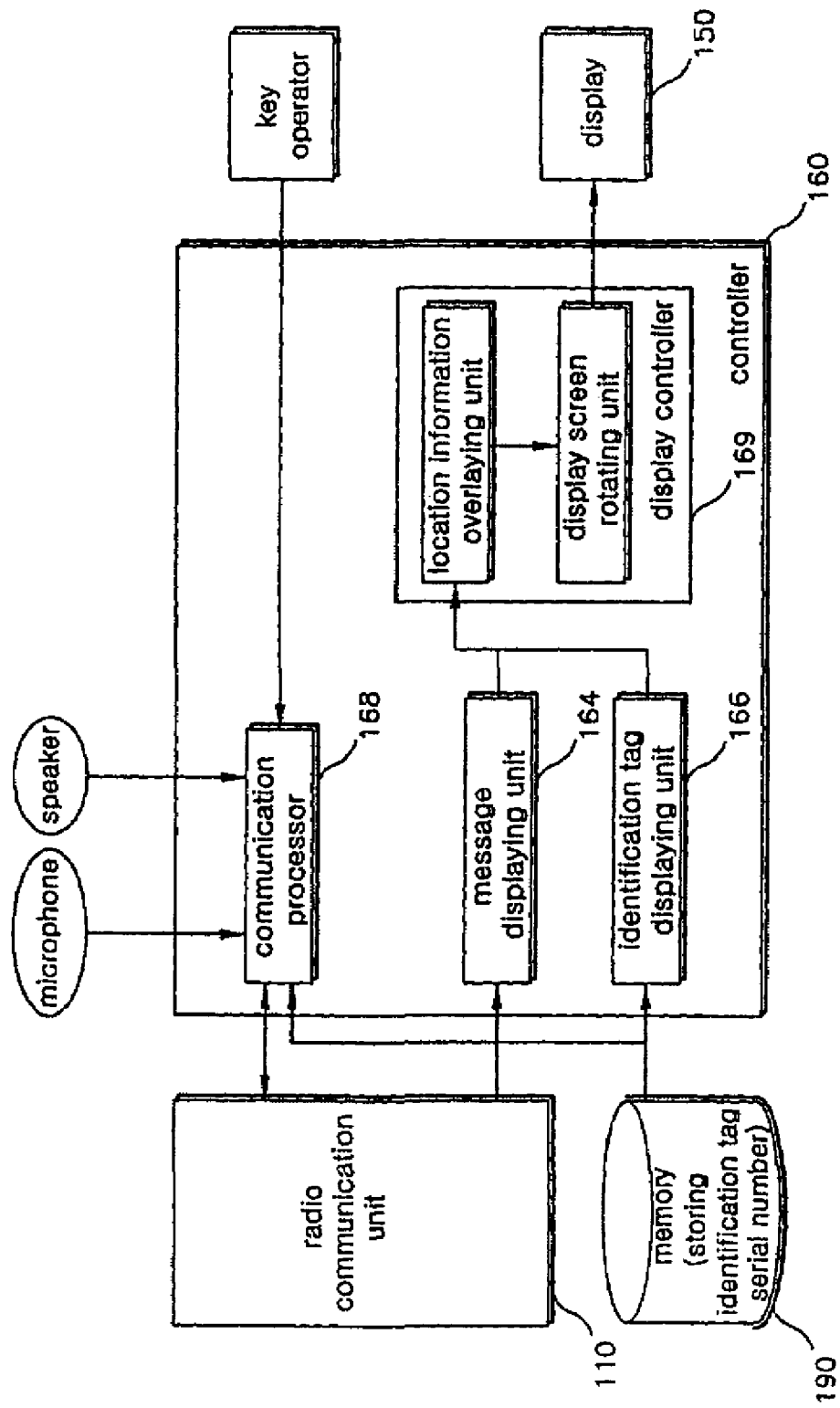
FIG. 4 is a block diagram showing additional functional blocks in the military wireless communication terminal shown in FIG. 2 or 3.

On the other hand, the military wireless communication terminal shown in FIG. 2 or 3 can further include a communication processor 168, as shown in FIG. 4. The communication processor 168 establishes a call connection between a designated originating place (for example, the military command post) and the soldier by generating a call sound in response to only a call from a terminal of the military command post, and by calling only the terminal of the military command post. The reason for the restriction of the generation of the call sound from the originating place and the calling to the terminal of the military command post is to prevent intervention by the enemy and maintain a communication security.

In addition, the terminal 100 according to an embodiment of the present invention can further include a message displaying unit 164 for displaying only a command and control message transmitted from a designated originating place, military command post, through the radio communicating unit 110, as shown in FIG. 4. The message displaying unit 164 is preferable to using the display 150 because the command and control message is displayer without requiring any key operation by the soldier. Furthermore, the terminal 100 according to the embodiment of the present invention can include an identification tag displaying unit 166 for accessing the personal information (information recorded in an identification tag) of the soldier stored in the memory 190 and displaying the personal information on the display 150 for medical treatment purposes.

In accordance with another embodiment of the present invention, the terminal 100 can further include a camera for photographing the iris of the soldier and an authentication processor for comparing the photographed iris with pre-stored iris information for granting the soldier access to the terminal. The reason for granting the soldier access to the terminal through such iris recognition is to prevent the terminal 100 from being used by the enemy forces if the enemy forces pick up the terminal.

The terminal 100 according to an embodiment of the present invention can also includes a bluetooth module. The bluetooth module is useful for exchanging intelligence or operational orders between neighboring soldiers of allied forces. In addition or in the alternative, the bluetooth module can perform wireless local area communication with vital signs sensors attached to the soldier's body or communication terminals of other soldier. Furthermore, the terminal 100 according to an embodiment of the present invention can incorporate a credit card chip to provide economic settlement for the soldier using the bluetooth module.

As is apparent from the above description, since the military wireless communication terminal of the present invention can transmit the location information of the soldier to the military command post, and receives and displays the location information of the enemy and allied forces located around the soldier from the military command post, there is an advantage in that the soldier can closely cooperate with allied forces in battle and be informed of the location of the enemy forces easily. In addition, since the military wireless communication terminal of the present invention can check the vital signs of the soldier and transmit the checked vital signs to the military command post at a remote location, there is an advantage in that the military command post can monitor operational performance capability of allied forces continuously to maintain efficient tactical operations. Furthermore, there is another advantage in that the military wireless communication terminal of the present invention can provide economic settlement for a soldier.

It will be apparent to those skilled in the art that various modifications and variations can be made in the of the present invention without departing from the spirit or scope of the invention. Thus, it is intended that the military wireless communication terminal of the present invention cover the modifications and variations of this invention provided they come within the scope of the appended claims and their equivalents.

What is claimed is:

1. A military wireless communication terminal for a soldier, comprising:
    a global positioning system receiver for receiving global positioning system signals and outputting location information of the terminal based on the received global positioning system signals;
    a terrestrial magnetism sensor for sensing azimuth of the terminal;
    a memory in which map information of an operating area is stored;
    a location transmitting unit for periodically transmitting terminal location information output from the global positioning system receiver;
    a radio communication unit for transmitting and receiving signals from a designated originating place;
    a military force location information processing unit for generating military force location information from a signal received from the radio communication unit;
    an absolute azimuth calculator for correcting sensed azimuth by the terrestrial magnetism sensor based on the terminal location information and outputting azimuth information;
    a map information reading unit for reading map information based on the terminal location information;
    a location information overlaying unit for overlaying the azimuth information, the military force location information on the read map information;
    a display for showing the read map information with the azimuth information and military force information overlaid; and
    a display screen rotating unit for dynamically rotating a displayed image such that true north is directed upward according to a user's instruction.

2. A military wireless communication terminal for a soldier, comprising:
    a global positioning system receiver for receiving global positioning system signals and outputting location information of the terminal based on the received global positioning system signals;
    a terrestrial magnetism sensor for sensing azimuth of the terminal;
    a memory in which map information of an operating area is stored;
    a location transmitting unit for periodically transmitting terminal location information output from the global positioning system receiver;
    a radio communication unit for transmitting and receiving signals from a designated originating place;
    a military force location information processing unit for generating military force location information from a signal received from the radio communication unit;
    an absolute azimuth calculator for correcting sensed azimuth by the terrestrial magnetism sensor based on the terminal location information and outputting azimuth information;
    a map information reading unit for reading map information based on the terminal location information;

a location information overlaying unit for overlaying the azimuth information, the military force location information on the read map information;

a display for showing the read map information with the azimuth information and military force information overlaid;

a body temperature sensor for sensing body temperature;

a vital signs sensor for sensing at least one of blood pressure and pulse; and a vital signs measuring and processing unit for measuring the vital signs of the soldier through the sensors and, when it is determined that the measured vital signs are abnormal, controlling the radio communication unit to a send a signal regarding the abnormal vital sign.

3. A military wireless communication terminal for a soldier, comprising:

a global positioning system receiver for receiving global positioning system signals and outputting location information of the terminal based on the received global positioning system signals;

a terrestrial magnetism sensor for sensing azimuth of the terminal;

a memory in which map information of an operating area is stored;

a location transmitting unit for periodically transmitting terminal location information output from the global positioning system receiver;

a radio communication unit for transmitting and receiving signals from a designated originating place;

a military force location information processing unit for generating military force location information from a signal received from the radio communication unit;

an absolute azimuth calculator for correcting sensed azimuth by the terrestrial magnetism sensor based on the terminal location information and outputting azimuth information;

a map information reading unit for reading map information based on the terminal location information;

a location information overlaying unit for overlaying the azimuth information, the military force location information on the read map information;

a display for showing the read map information with the azimuth information and military force information overlaid; and a memory in which personal information of the soldier is stored, wherein the stored personal information of the soldier is accessed by the vital signs measuring and processing unit and is transmitted wirelessly together with the vital signs of the soldier.

4. A military wireless communication terminal for a soldier, comprising:

a global positioning system receiver for receiving global positioning system signals and outputting location information of the terminal based on the received global positioning system signals;

a terrestrial magnetism sensor for sensing azimuth of the terminal;

a memory in which map information of an operating area is stored;

a location transmitting unit for periodically transmitting terminal location information output from the global positioning system receiver;

a radio communication unit for transmitting and receiving signals from a designated originating place;

a military force location information processing unit for generating military force location information from a signal received from the radio communication unit;

an absolute azimuth calculator for correcting sensed azimuth by the terrestrial magnetism sensor based on the terminal location information and outputting azimuth information;

a map information reading unit for reading map information based on the terminal location information;

a location information overlaying unit for overlaying the azimuth information, the military force location information on the read map information;

a display for showing the read map information with the azimuth information and military force information overlaid;

a camera for photographing iris of the soldier; and an authentication processor for comparing the photographed iris with pre-stored iris information for granting the soldier access to the terminal.

5. The military wireless communication terminal as set forth in claim 3, further comprising an identification tag processor for accessing and displaying the personal information of the soldier.

6. A military wireless communication terminal for a soldier, comprising:

a global positioning system receiver for receiving global positioning system signals and outputting location information of the terminal based on the received global positioning system signals;

a terrestrial magnetism sensor for sensing azimuth of the terminal;

a memory in which map information of an operating area is stored;

a location transmitting unit for periodically transmitting terminal location information output from the global positioning system receiver;

a radio communication unit for transmitting and receiving signals from a designated originating place;

a military force location information processing unit for generating military force location information from a signal received from the radio communication unit;

an absolute azimuth calculator for correcting sensed azimuth by the terrestrial magnetism sensor based on the terminal location information and outputting azimuth information;

a map information reading unit for reading map information based on the terminal location information;

a location information overlaying unit for overlaying the azimuth information, the military force location information on the read map information;

a display for showing the read map information with the azimuth information and military force information overlaid; and a communication processor for establishing a call connection by generating a call sound in response to only a call from a designated originating place and by calling only a designated destination terminal.

7. A military wireless communication terminal for a soldier, comprising:

a global positioning system receiver for receiving global positioning system signals and outputting location information of the terminal based on the received global positioning system signals;

a terrestrial magnetism sensor for sensing azimuth of the terminal;

a memory in which map information of an operating area is stored;

a location transmitting unit for periodically transmitting terminal location information output from the global positioning system receiver;

a radio communication unit for transmitting and receiving signals from a designated originating place;

a military force location information processing unit for generating military force location information from a signal received from the radio communication unit;

an absolute azimuth calculator for correcting sensed azimuth by the terrestrial magnetism sensor based on the terminal location information and outputting azimuth information;

a map information reading unit for reading map information based on the terminal location information;

a location information overlaying unit for overlaying the azimuth information, the military force location information on the read map information;

a display for showing the read map information with the azimuth information and military force information overlaid; and a message displaying unit on which only a command and control message transmitted from the designated originating place is displayed.

8. The military wireless communication terminal as set forth in claim 1, further comprising a bluetooth module for performing wireless local area communication with vital signs sensors attached to the soldier's body or communication terminals of other soldiers.

9. The military wireless communication terminal as set forth in claim 1, further comprising a bluetooth module for performing wireless local area communication with terminals of other soldiers.

10. The military wireless communication terminal as set forth in claim 9, further comprising a credit card chip for economic settlement.

11. The military wireless communication terminal as set forth in claim 1, wherein the military force is one of an allied force and an enemy force.

12. A military wireless communication terminal, comprising:

a global positioning system receiver for receiving global positioning system signals and outputting location information of the terminal based on the received global positioning system signals;

a terrestrial magnetism sensor for sensing azimuth of the terminal;

a memory in which map information of an operating area is stored;

a location transmitting unit for periodically transmitting the location information output from the global positioning system receiver;

a radio communication unit for transmitting the location information of the terminal outputted from the location transmitting unit wirelessly and receiving signals;

a body temperature sensor for sensing body temperature;

a vital signs sensor for sensing at least one of blood pressure and pulse;

a vital signs measuring and processing unit for measuring the vital signs of a soldier through the sensors and, when it is determined that the measured vital signs are abnormal, controlling the radio communication unit to a send a signal regarding the abnormal vital sign;

a military force location information processing unit for generating military force location information from a signal received from the radio communication unit;

an absolute azimuth calculator for correcting sensed azimuth by the terrestrial magnetism sensor based on the terminal location information and outputting azimuth information;

a map information reading unit for reading map information based on the terminal location information;

a location information overlaying unit for overlaying the azimuth information, the military force location information on the read map information; and a display for showing the read map information with the azimuth information and military force information overlaid.

13. The military wireless communication terminal as set forth in claim 12, further comprising a memory in which personal information of the soldier is stored, wherein the stored personal information of the soldier is accessed by the vital signs measuring and processing unit and is transmitted wirelessly together with vital signs of the soldier.

14. The military wireless communication terminal as set forth in claim 12, further comprising:

a camera for photographing iris of the soldier; and an authentication processor for comparing the photographed iris with pre-stored iris information for granting the soldier access to the terminal.

15. The military wireless communication terminal as set forth in claim 12, further comprising a message displaying unit on which only a command and control message transmitted from a designated originating place is displayed.

16. The military wireless communication terminal as set forth in claim 12, further comprising a bluetooth module for performing wireless local area communication with the vital signs sensors attached to the soldier's body.

17. The military wireless communication terminal as set forth in claim 12, further comprising a bluetooth module for performing wireless local area communication with terminals of other soldiers.

18. The military wireless communication terminal as set forth in claim 17, further comprising a credit card chip for economic settlement.

19. The military wireless communication terminal as set forth in claim 12, wherein the military force is one of an allied force and an enemy force.

* * * * *